(12) United States Patent
Koide et al.

(10) Patent No.: US 7,759,757 B2
(45) Date of Patent: Jul. 20, 2010

(54) ELECTRO-OPTICAL DEVICE AND ELECTRONIC APPARATUS

(75) Inventors: Shin Koide, Chino (JP); Hiroko Muramatsu, Yokohama (JP); Shin Fujita, Suwa (JP)

(73) Assignee: Sony Corporation, Tokyo (JP)

( * ) Notice: Subject to any disclaimer, the term of this patent is extended or adjusted under 35 U.S.C. 154(b) by 25 days.

(21) Appl. No.: 12/314,658

(22) Filed: Dec. 15, 2008

(65) Prior Publication Data

US 2009/0135325 A1 May 28, 2009

Related U.S. Application Data

(62) Division of application No. 11/708,534, filed on Feb. 21, 2007, now Pat. No. 7,498,649.

(30) Foreign Application Priority Data

Mar. 1, 2006 (JP) ............................ 2006-054425

(51) Int. Cl.
*H01L 33/00* (2010.01)
(52) U.S. Cl. .................. 257/458; 257/436; 257/431; 257/E33.046; 257/290
(58) Field of Classification Search ........... 257/431, 257/436, 458, 290, E33.046
See application file for complete search history.

(56) References Cited

U.S. PATENT DOCUMENTS 6,489,631 B2 * 12/2002 Young et al. ................ 257/59

2006/0030084 A1 * 2/2006 Young .................... 438/149
2007/0200971 A1 * 8/2007 Koide et al. ................ 349/61

FOREIGN PATENT DOCUMENTS

| JP | U-63-134557 | 9/1988 |
| JP | A-2000-122575 | 4/2000 |
| JP | A-2000-131137 | 5/2000 |
| JP | A-2003-078838 | 3/2003 |
| JP | A-2003-152217 | 5/2003 |
| JP | A-2004-078160 | 3/2004 |
| JP | A-2005-121997 | 5/2005 |

OTHER PUBLICATIONS

Tomihari Y. et al., "27.4: A Low Temperature Poly-Si TFT Liquid Crystal Light Valve (LCLV) with a Novel Light-Shielding Structure for High Performance Projection Displays," 2004, SID 04 Digest.

* cited by examiner

*Primary Examiner*—Victor A Mandala
(74) *Attorney, Agent, or Firm*—K&L Gates LLP

(57) ABSTRACT

An electro-optical device includes an insulating substrate, a switching element, at least one PIN diode, and at least one reflector. The switching element includes a first polysilicon semiconductor layer formed on the insulating substrate, and a gate electrode formed between the insulating substrate and the first semiconductor layer. Each of the at least one PIN diode includes a second polysilicon semiconductor layer formed on the insulating substrate. The at least one reflector is formed in the same layer as the gate electrode and opposite the second semiconductor layer or layers of the at least one PIN diode.

11 Claims, 5 Drawing Sheets

ELECTRO-OPTICAL DEVICE AND ELECTRONIC APPARATUS

This is a Divisional of U.S. patent application Ser. No. 11/708,534 filed on Feb. 21, 2007 now U.S. Pat. No. 7,498,649, which is hereby incorporated by reference in its entirety. This application claims priority to Japanese Patent Application No. 2006-054425 filed Mar. 1, 2006, which is hereby incorporated by reference in its entirety.

BACKGROUND

1. Technical Field

The present invention relates to electro-optical devices and electronic apparatuses suitable for display devices that control their display luminances.

2. Related Art

A liquid crystal panel includes two substrates, such as glass substrates or quartz substrates, and liquid crystal filled therebetween. The substrates are provided with electrodes, and image signals are supplied to the electrodes. The optical characteristic of the liquid crystal between the electrodes of the substrates changes according to the image signals. That is to say, by applying voltages based on the image signals to the liquid crystal between the electrodes of the substrates, the alignment of liquid crystal molecules is changed. Thus, the light transmittance in each pixel changes according to the image signals, and an image display according to the image signals is performed.

In order to perform a high-luminance display in such a liquid crystal panel, in general, a backlight unit is provided at the back of a liquid crystal panel. A backlight unit that improves its illumination uniformity using a light guide plate has been developed. By illuminating a display region of a liquid crystal panel with a backlight unit, a display on the display region can be observed with a sufficient luminance.

The viewability of display of a liquid crystal panel changes depending on the ambient brightness. For example, when the ambient light is bright, the display is less viewable, and therefore the illumination of the display region needs to be brighter. Conversely, when the ambient light is sufficiently dark, the display region need not be brighter than necessary.

JP-A-2003-78838 discloses a technique to provide an easily viewable display independently of the ambient brightness. In the technique, the ambient light is detected, and the luminance of a backlight unit is controlled on the basis of the feedback information.

The apparatus of JP-A-2003-78838 uses a discrete component as a light sensor for detecting the ambient light. Therefore, the light sensor needs to be mounted on a flexible printed board. This increases the man-hour and the cost.

To solve this problem, a PIN diode light sensor can be formed on a substrate constituting a display panel, such as a liquid crystal panel. In this case, the PIN diode is formed in the same layer as the semiconductor layer in the display region.

The semiconductor layer in the display region is set to a comparatively small thickness in order to obtain desired transistor characteristics. However, in the case where the semiconductor layer in the PIN diode forming region is thin, incident light passes through the semiconductor layer, and photogenerated charges cannot be efficiently generated. That is to say, light is not efficiently incident on the intrinsic layer, and a sufficient light sensitivity cannot be obtained.

SUMMARY

An advantage of some aspects of the invention is that an electro-optical device and an electronic apparatus according to the invention can have a sufficient light sensitivity by enabling light to be efficiently incident on the intrinsic layer.

According to an aspect of the invention, an electro-optical device includes an insulating substrate, a switching element, at least one PIN diode, and at least one reflector. The switching element includes a first polysilicon semiconductor layer formed on the insulating substrate, and a gate electrode formed between the insulating substrate and the first semiconductor layer. Each of the at least one PIN diode includes a second polysilicon semiconductor layer formed on the insulating substrate. The at least one reflector is formed in the same layer as the gate electrode and opposite the second semiconductor layer or layers of the at least one PIN diode.

Due to this configuration, the insulating substrate is provided with a bottom gate switching element formed by the first semiconductor layer and the gate electrode, which is formed between the insulating substrate and the first semiconductor layer. In addition, the insulating substrate is also provided with the at least one PIN diode, which receives light incident via the light-receiving surface of the insulating substrate. Part of the light incident on the insulating substrate passes through the second semiconductor layer of the at least one PIN diode. Between the insulating substrate and the second semiconductor layer, the at least one reflector is provided so as to face the second semiconductor layer. The light passing through the second semiconductor layer is reflected by the at least one reflector and reenters the second semiconductor layer. Thus, most of the light incident from the light-receiving surface of the insulating substrate can be made incident on the at least one PIN diode, and the ambient light can be detected with high sensitivity.

Each of the at least one reflector is preferably wider than the second semiconductor layer of the corresponding PIN diode so as to face the entire region of the second semiconductor layer of the corresponding PIN diode.

Due to this configuration, most of the light passing through the second semiconductor layer can be reflected so as to reenter the second semiconductor layer. In addition, since the at least one reflector faces the entire region of the second semiconductor layer, that is to say, both the cathode and the anode, the at least one reflector can be prevented from affecting the characteristics of the at least one PIN diode.

It is preferable that the at least one PIN diode include a plurality of PIN diodes arranged on the insulating substrate and that the at least one reflector include a plurality of reflectors each provided opposite the second semiconductor layer of the corresponding PIN diode.

Due to this configuration, the change in characteristics of each PIN diode due to the reflectors can be uniformized, and stable characteristics can be obtained.

Each of the at least one reflector is preferably connected to a predetermined fixed potential point.

Due to this configuration, the at least one reflector is out of the floating status, and the at least one reflector can be prevented from affecting the characteristics of the at least one PIN diode.

The predetermined fixed potential point to which each of the at least one reflector is connected is preferably the anode or the cathode of the corresponding PIN diode.

In this case, the configuration is simple, and the at least one reflector can be brought to a fixed potential.

It is preferable that the electro-optical device further include an illuminating unit that irradiates the insulating substrate with illuminating light, and a shielding plate for blocking the light from the illuminating unit from being incident on the at least one PIN diode.

Due to this configuration, the light from the illuminating unit is blocked from entering the at least one PIN diode by the shielding plate. Thus, the ambient light can be accurately detected by the at least one PIN diode.

It is preferable that an electronic apparatus include the electro-optical device according to the above aspect of the invention.

Due to this configuration, the ambient light can be detected with high sensitivity, and display can be optimized according to the illuminance of the ambient light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
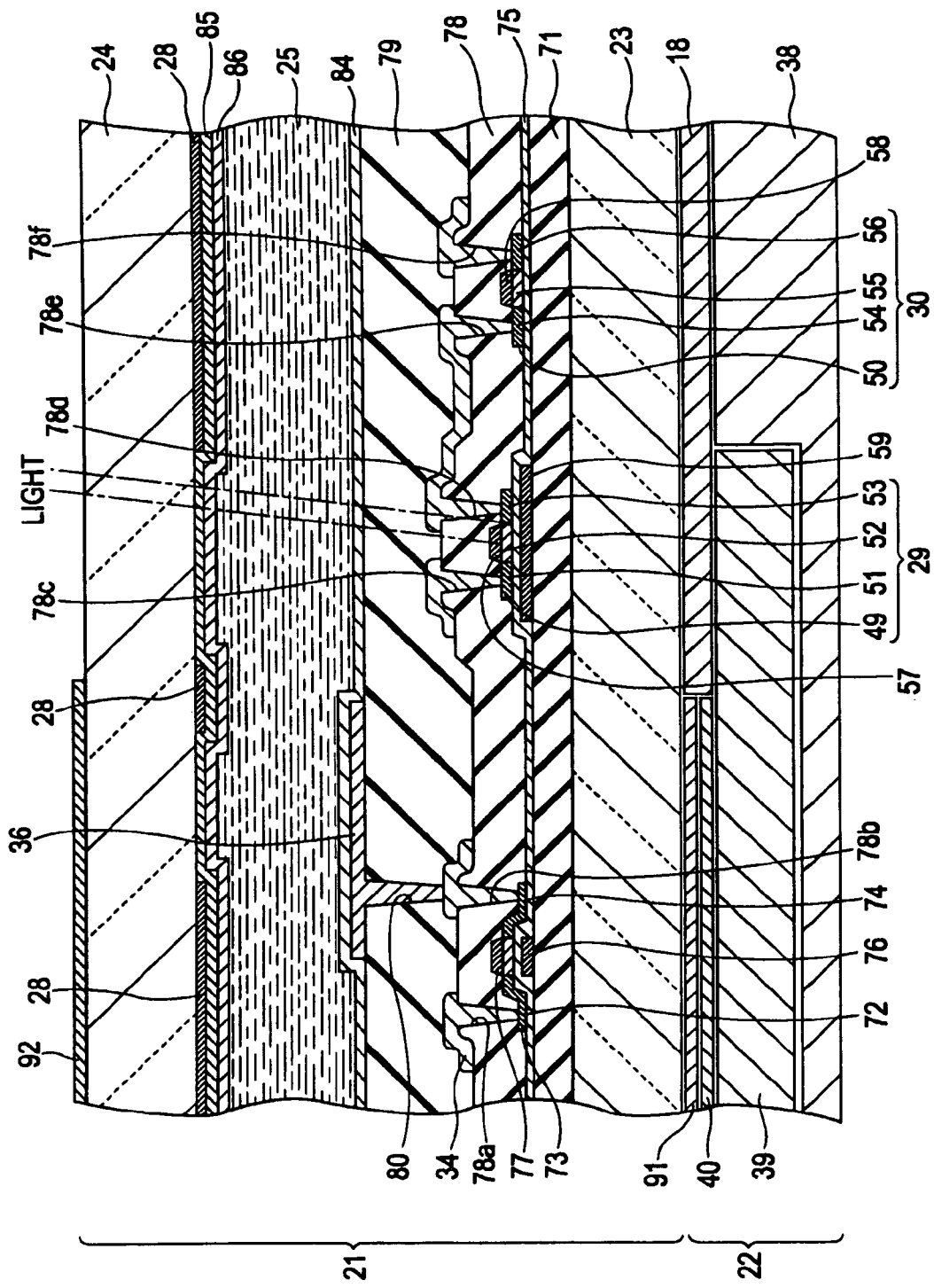
FIG. 1 is a sectional view of an electro-optical device according to a first exemplary embodiment of the invention.
Figure 2:
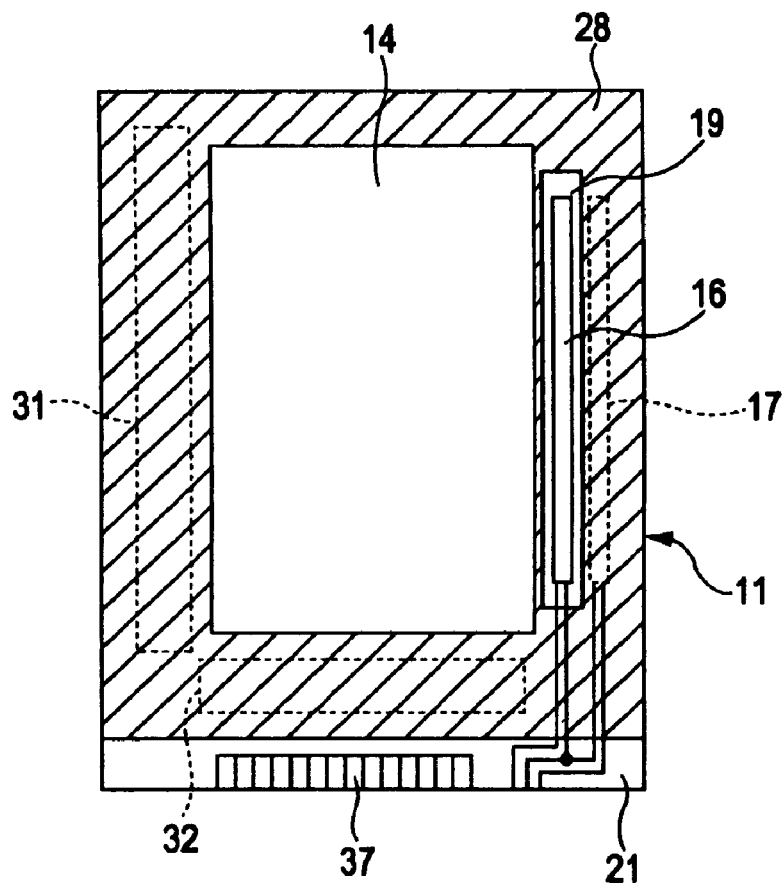
FIG. 2 is a plan view of the electro-optical device according to the first exemplary embodiment.
Figure 3:
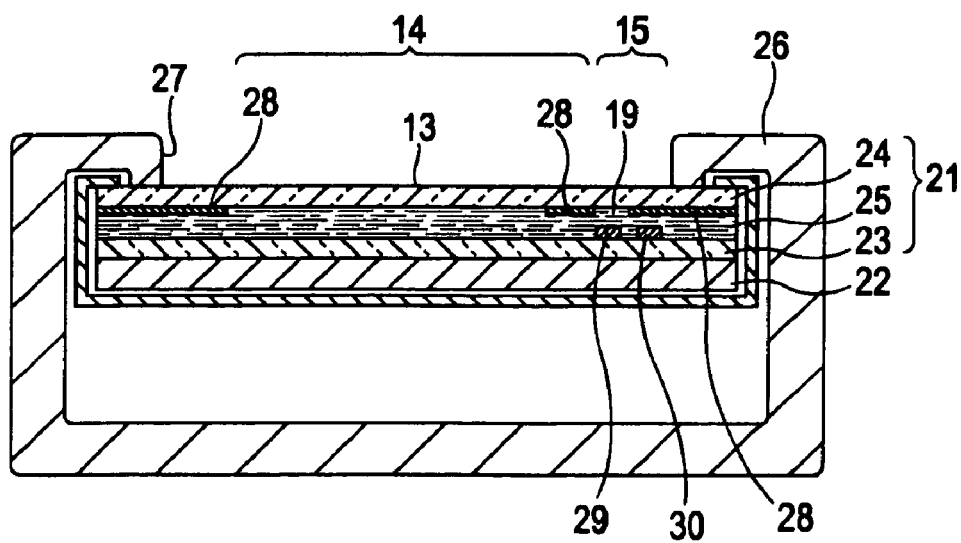
FIG. 3 schematically illustrates the sectional structure of a liquid crystal panel employed as the electro-optical device of FIG. 2, the liquid crystal panel being contained in a case.
Figure 4:
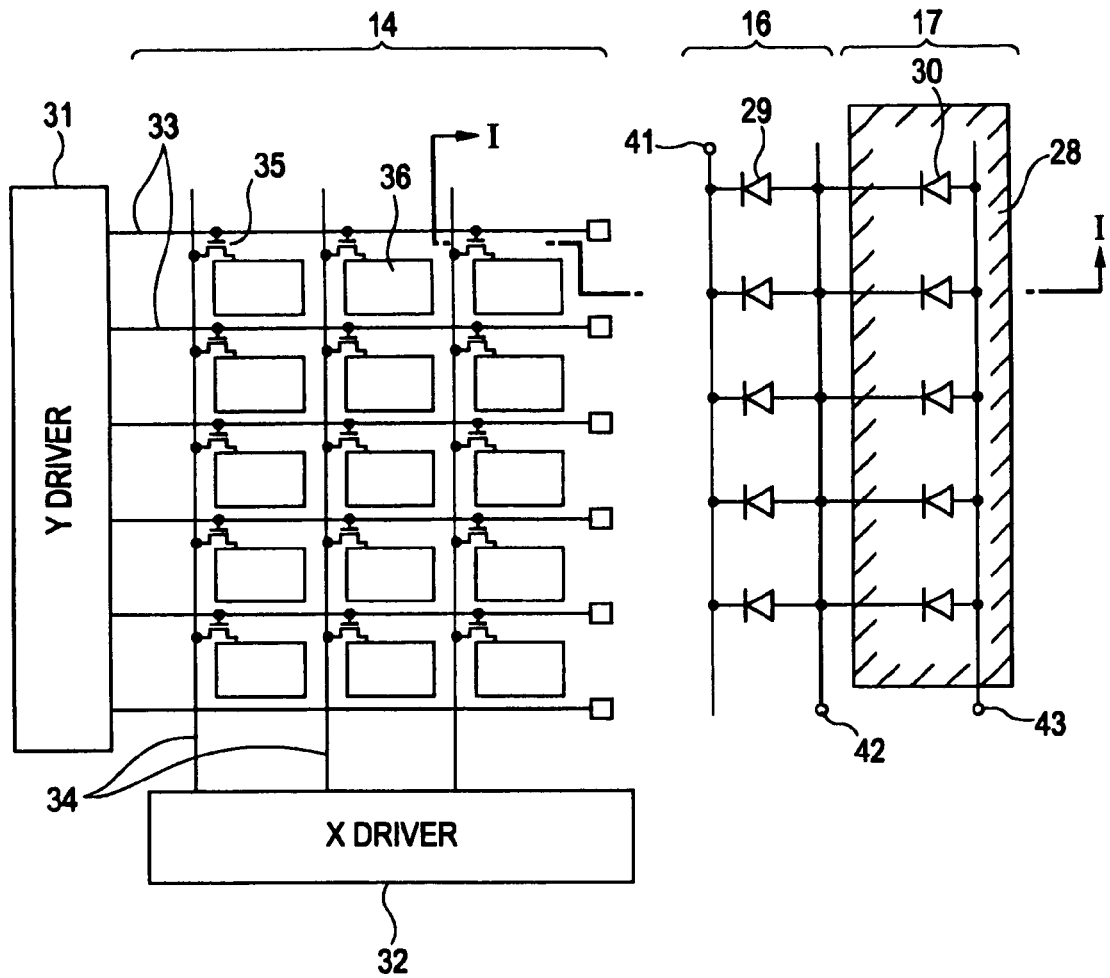
FIG. 4 schematically illustrates the two-dimensional pattern of a display panel employed as the electro-optical device of FIG. 2.

The exemplary embodiments of the invention will now be described in detail with reference to the drawings. FIG. 1 is a sectional view of an electro-optical device according to a first exemplary embodiment of the invention. FIG. 2 is a plan view of the electro-optical device according to the first exemplary embodiment. FIG. 3 schematically illustrates the sectional structure of a liquid crystal panel employed as the electro-optical device of FIG. 2, the liquid crystal panel being contained in a case. FIG. 4 schematically illustrates the two-dimensional pattern of a display panel employed as the electro-optical device of FIG. 2.

First Exemplary Embodiment

First, the overall structure of the electro-optical device according to the first exemplary embodiment will be described with reference to FIGS. 2 to 4.

In FIG. 2, the electro-optical device 11 includes a display panel 21 including two substrates stuck together. In the case of FIG. 3, a liquid crystal panel is employed as the display panel 21. In this case, the electro-optical device 11 includes the display panel 21 and an illuminating unit 22. A self-luminous display panel can also be employed as the electro-optical device. In this case, no illuminating unit is necessary.

As shown in FIG. 3, the display panel 21 includes a light-transmitting element substrate 23, a light-transmitting opposing substrate 24, and liquid crystal 25 enclosed therebetween. The element substrate 23 and the opposing substrate 24 facing each other are stuck together with a sealing material (not shown). The display panel 21 includes, for example, a plurality of scanning lines 33 extending in the horizontal direction (see FIG. 4), a plurality of data lines 34 extending in the vertical direction (see FIG. 4). Pixels are formed at the intersections of the plurality of scanning lines 33 with the plurality of data lines 34.

on the element substrate 23 are disposed pixel electrodes (ITO) 36 (see FIG. 4). On the opposing substrate 24 is provided an opposing electrode (common electrode (ITO)) (not shown). On the pixel electrodes of the element substrate 23 is provided a rubbed alignment film (not shown) in contact with the liquid crystal 25. On the other hand, on the opposing substrate 24 is also provided a rubbed alignment film (not shown) in contact with the liquid crystal 25. Each alignment film is a transparent organic film, for example, a polyimide film. In addition, on the opposing substrate 24 is formed a shielding film (not shown) along the data lines 34 and the scanning lines 33.

Although not shown in FIG. 3, the observing side of the opposing substrate 24 and the side opposite from the element forming surface (hereinafter also referred to as "light receiving surface") of the element substrate 23 are each provided with a polarizer. The polarizing axes of these polarizers are set so as to correspond to the rubbing directions of the alignment films formed on the element substrate 23 and the opposing substrate 24.

The illuminating unit 22 functioning as a backlight unit emits light from under the element substrate 23 of the display panel 21. The illuminating unit 22 includes, for example, a plurality of light-emitting diodes (hereinafter referred to as LEDs) serving as a light source, and a light guide plate. The light from the LEDs is guided into the light guide plate, is reflected and scattered by reflecting layers on the bottom surface and the side surfaces of the light guide plate, and is then emitted from the upper surface of the light guide plate. In this way, backlight is incident on the display panel 21 disposed above the illuminating unit 22.

The illuminating unit 22 and the display panel 21 are contained in a case 26, being stacked one on top of the other. The case 26 has an opening 27 formed in the upper surface thereof. The display panel 21 is fixed inside the case 26 so that a screen 13 of the display panel 21 faces the opening 27.

The display panel 21 has an effective display region 14 in the center of the screen 13 defined by the opening 27 of the case 26. In the effective display region 14 are formed pixels corresponding to the intersections of the scanning lines 33 with the data lines 34.

In the display panel 21, the data lines 34 are supplied with image signals, and the scanning lines 33 are supplied with scanning signals. Thus, each pixel is driven on the basis of the image signals and changes its light transmittance. The light entering the display panel 21 from the illuminating unit 22 is modulated in the effective display region 14 of the display panel 21. Therefore, when the effective display region 14 is observed from the opening 27 side of the case 26, an image can be viewed. On the opposing substrate 24 is formed a shielding film 28 (the shaded area in FIG. 2) for shielding the periphery of the opposing substrate 24. The shape and the size of the effective display region 14 are defined by this shielding film 28.

on the periphery of the effective display region 14 in the screen 13 is provided a non-display region 15. In this non-display region 15 are provided light-receiving-element disposing regions 16 and 17 for disposing PIN diodes 29 and 30, respectively, which are light receiving elements for detecting the illuminance. In the light-receiving-element disposing region 17, the shielding layer 28 is formed on the opposing substrate 24 so as to block the ambient light from being incident on the element substrate 23.

The light-receiving-element disposing region 16 is provided in an opening region 19 where the shielding film 28 is not formed on the opposing substrate 24. The light-receiving-element disposing region 16 transmits light from the upper surface (observing surface) of the opposing substrate 24.

In the light-receiving-element disposing region 16 are disposed the PIN diodes 29. In the light-receiving-element disposing region 17 are disposed the PIN diodes 30. The ambient light entering from the observing surface of the opposing substrate 24 is incident on the PIN diodes 29, which can thereby detect the illuminance of the ambient light. On the other hand, the ambient light is blocked from being incident on the PIN diodes 30 by the shielding film 28. Therefore, the PIN diodes 30 can be used, for example, for detecting the dark current, or for detecting the backlight from the illuminating unit 22.

As shown in FIG. 4, the plurality of scanning lines 33 extend from a Y driver 31, and the plurality of data lines 34 extend from an X driver 32. At the intersections of the scanning lines 33 with the data lines 34 are provided switching elements 35. The switching elements 35 are ON-OFF controlled by the scanning signals supplied from the Y driver 31 to the scanning lines 33. When turned on, the switching elements 35 supply the image signals supplied from the X driver 32 to the data lines 34 to the pixel electrodes 36.

Although the display panel 21 shown in FIG. 4 is a TFT liquid crystal panel, other active matrix display panels can also be employed as long as the pixels in the effective display region are driven by drivers.

A terminal portion 37 is provided on a short side of the display panel 21 near which the X driver 32 is disposed. The Y driver 31 and the X driver 32 are connected to the terminal portion 37 by interconnects (not shown).

As shown in FIG. 4, the PIN diodes 29 are provided in the light-receiving-element disposing region 16, and the PIN diodes 30 are provided in the light-receiving-element disposing region 17. The PIN diodes 29 and 30 are formed by providing an I-type region between a P-type region and an N-type region. Although the I-type region means "intrinsic region," the I-type region may be doped sufficiently more lightly than the N-type region or the P-type region.

As shown in FIG. 4, the cathodes of the PIN diodes 29 are common-connected and are connected to a terminal 41, and the anodes of the PIN diodes 29 are common-connected and are common-connected to the cathodes of the PIN diodes 30 and a terminal 42. The anodes of the PIN diodes 30 are common-connected and are connected to a terminal 43.

Each PIN diode 29 generates an output based on the illuminance of incident light. Each PIN diode 30 generates an output based on the dark current. This configuration makes it possible to remove the component of the dark current and to detect the illuminance of the ambient light.

Figure 5:
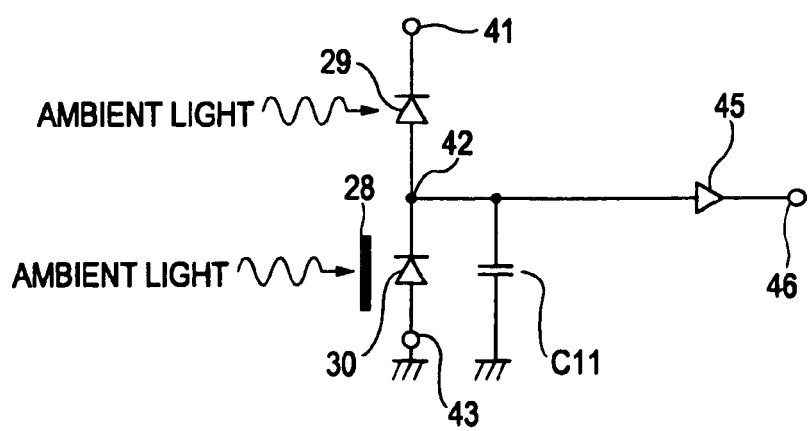
FIG. 5 is an equivalent circuit diagram showing the connection status of the PIN diodes 29 and 30.

FIG. 5 is an equivalent circuit diagram showing the connection status of the PIN diodes 29 and 30 in this case. The PIN diode 29 is used for detecting the ambient light. The PIN diode 30 is used for detecting the dark current.

In the example of FIG. 5, the terminal 41 is connected to a power terminal, and the terminal 43 is connected to a reference potential point. The PIN diodes 29 and 30 are series-connected between the power terminal and the reference potential point. A capacitor C11 is provided between the reference potential point and the terminal 42, which is connected to the connection point between the PIN diodes 29 and 30. The terminal 42 is also connected to an output terminal 46 via an amplifier 45.

Due to this configuration, the diode 30 generates an output based on the dark current, and the diode 29 generates a detection current corresponding to the ambient light. Thus, a current that is the difference between the dark current and the detection current corresponding to the ambient light flows into the amplifier 45 connected to the connection point between the diodes 30 and 29. Thus, the amplifier 45 outputs a detection current of the ambient light from which the dark current component is removed.

In this exemplary embodiment, the switching elements 35 in the effective display region 14 and the PIN diodes 29 and 30 in the light-receiving-element disposing regions 16 and 17 include polysilicon semiconductor layers on the element substrate 23, which is an insulating substrate. In this exemplary embodiment, bottom gate TFTs (thin film transistors) are employed as the switching elements 35 in the effective display region 14.

FIG. 1 shows an example of the sectional structure of the PIN diodes 29 and 30. FIG. 1 is a sectional view taken along line I-I of FIG. 4.

In the display panel 21 of FIG. 1, a base insulating film 71 is formed on a transparent insulating substrate 23, such as a quartz substrate or a glass substrate.

First, the configuration of a region where pixels are formed will be described, the region including the effective display region 14.

In the region where pixels are formed, gate electrodes 76 are formed on the base insulating film 71. Each gate electrode 76 constitutes a TFT serving as a switching element. The gate electrodes 76 are formed of a metal material, for example, chromium, molybdenum, or titanium. The gate electrodes 76 are connected to the scanning lines 33. On the base insulating film 71 and the gate electrodes 76 is formed an oxide film 75.

On the oxide film 75 are formed semiconductor layers 73 each constituting a TFT. The semiconductor layers 73 are formed of polysilicon, which is a polycrystalline semiconductor. The polysilicon is formed by laser-annealing and crystallizing amorphous silicon, which is a non-single-crystal non-crystalline semiconductor.

The both ends of each semiconductor layer 73 are doped so as to form a source region 72 and a drain region 74.

The source region 72 and the drain region 74 have an LDD structure. That is to say, the source region 72 and the drain region 74 have a comparatively lightly doped part near the channel region above the gate electrode 76. In order to form an LDD structure in the semiconductor layer 73, the semiconductor layer 73 is doped twice so as to form a lightly doped region and a heavily doped region in the source region 72 and the drain region 74. In the first doping process, the entire region of the source region 72 and the drain region 74 is heavily doped. Next, after a channel protecting film 77 is formed on the semiconductor layer 73, the second doping process is performed. In the second doping process, both ends of the semiconductor layer 73 is comparatively lightly doped. At this time, the channel protecting film 77 is used as a mask.

on the semiconductor layers 73 and the channel protecting films 77 is formed an interlayer insulating film 78. The interlayer insulating film 78 has contact holes 78a and 78b formed over the source region 72 and the drain region 74, respectively, of each TFT. The source regions 72 are connected to the data lines 34 via the contact holes 78a.

On an interconnect layer in which the data lines 34 are formed and on the interlayer insulating film 78 is formed another interlayer insulating film 79. The interlayer insulating film 79 has contact holes 80 formed therein. The drain region 74 of each TFT is connected to the corresponding pixel electrode 36, which is formed on the interlayer insulating film 79, via the corresponding contact holes 78b and 80.

In the light-receiving-element disposing regions 16 and 17, the PIN diodes 29 and 30 are formed on the base insulating film 71. The PIN diodes 29 and 30 are formed in the same manufacturing process as the TFTs in the effective display region 14.

That is to say, each PIN diode 29 has an N-type region 51, a P-type region 53, and an I-type region 52 in a semiconductor layer 49 formed in the same layer as the semiconductor layers 73. The N-type region 51 is doped with an N-type impurity. The P-type region 53 is doped with a P-type impurity. The I-type region 52 is an intrinsic semiconductor or is doped with a very small amount of impurity. Each PIN diode 30 has an N-type region 54, a P-type region 56, and an I-type region 55 in a semiconductor layer 50 formed in the same layer as the semiconductor layers 73. The N-type region 54 is doped with an N-type impurity. The P-type region 56 is doped with a P-type impurity. The I-type region 55 is an intrinsic semiconductor or is doped with a very small amount of impurity.

These regions 51 to 56 are formed on the oxide film 75 which is the same film as that in the effective display region 14. On the channel of each semiconductor layer 49 is formed a channel protecting film 57. On the channel of each semiconductor layer 50 is formed a channel protecting film 58. The channel protecting films 57 and 58 are formed in the same process as the channel protecting films 77 of the TFTs and are, for example, oxide silicon films.

As described above, in the effective display region 14, in order to form an LDD structure in each semiconductor layer 73, two doping processes are performed. The channel protecting films 57 and 58 can block the I-type regions 52 and 55 from being lightly doped in the second doping process.

The interlayer insulating film 78 has contact holes 78c to 78f formed over the N-type region 51 and the P-type region 53 of each PIN diode 29 and the N-type region 54 and the P-type region 56 of each PIN diode 30. On the interlayer insulating film 78 and in the same layer as the data lines 34 are formed interconnects that are connected to the terminals 41 to 43. The regions 51, 53, 54, and 56 are connected to these interconnects via the contact holes 78c to 78f. The interconnects have a three-layer structure of, for example, titanium, aluminum, and titanium. To the terminal 42 are common-connected the N-type regions 54 and the P-type regions 53.

On the interconnect layer on the interlayer insulating film 78 and on the interlayer insulating film 78 is formed the interlayer insulating film 79. On the pixel electrodes 36 and the interlayer insulating film 79 is formed an alignment film 84 in contact with the liquid crystal 25. The alignment film 84 is rubbed in a predetermined direction.

On the other hand, on the opposing substrate 24 is formed a shielding film 28, which defines the effective display region 14 and the opening region 19 (see FIG. 2). On the shielding film 28 and the opposing substrate 24 is formed a common electrode 85. On the common electrode 85 is formed an alignment film 86. The alignment film 86 is rubbed in a predetermined direction. The observing side of the opposing substrate 24 is provided with a polarizer 92.

In this exemplary embodiment, a reflector 59 is formed under each PIN diode 29 detecting the illuminance of the ambient light. Each reflector 59 is formed in the same layer as the gate electrode 76 constituting each switching element in the effective display region 14. Each reflector 59 is formed opposite the corresponding semiconductor layer 49 with the oxide film 75 therebetween. Each reflector 59 reflects the light entering from the opposing substrate 24 side, passing through the corresponding semiconductor layer 49, and traveling toward the element substrate 23 so that the light is incident on the corresponding I-type region 52.

Thus, most of the light incident via the opening region 19 can be made incident on the I-type regions 52.

The illuminating unit 22 includes an outer frame 38 and a light guide plate 39 fitted in a depression in the outer frame 38. On the light guide plate 39, at least in the effective display region 14, an optical sheet 40 is disposed. The light from the light guide plate 39 is diffused and emitted upward by the optical sheet 40. On the optical sheet 40 is disposed a polarizer 91.

Opposite the light-receiving-element disposing regions 16 and 17, a shielding plate 18 is provided on the outer frame 38 and the light guide plate 39. The shielding plate 18 blocks light from the light guide plate 39 from traveling toward the PIN diodes 29 and 30. Each reflector 59 blocks the light from the illuminating unit 22 from traveling toward the corresponding PIN diode 29.

Due to the above configuration, the light incident from the observing side of the opposing substrate 24 travels toward the element substrate 23 via the opening region 19. Part of this incident light is incident on the I-type region 52 of each PIN diode 29 from above. However, another part of the incident light passes through each semiconductor layer 49 and travels toward the element substrate 23. In this exemplary embodiment, under each semiconductor layers 49, the reflector 59 is provided. The ambient light passing through the semiconductor layers 49 is reflected by the reflectors 59 disposed under the semiconductor layers 49 and enters the I-type regions 52 of the PIN diodes 29 from below. Thus, a sufficient amount of ambient light can be made incident on the I-type regions 52 of the PIN diodes 29.

In each PIN diode 29, a detection current corresponding to the photogenerated charge flows via a depletion layer generated in the I-type region 57. This detection current is output to the outside via the interconnects connected to the regions 51 and 53. Thus, the illuminance of the ambient light can be detected.

The ambient light is blocked from being incident on the PIN diodes 30 by the shielding layer 28, and therefore the PIN diodes 30 can detect the dark current. The PIN diodes 29 can also detect the illuminance of the backlight from the illuminating unit 22.

By using the detection results of the PIN diodes 29 and 30, for example, the brightness of the illuminating unit 22 can be controlled according to the brightness of the ambient light. For example, when the PIN diodes 29 and 30 detect that the ambient light is bright, the brightness of the illuminating unit 22 is increased according to the brightness of the ambient light. This can improve the visibility of display.

As described above, in this exemplary embodiment, the reflectors 59 are provided under the PIN diodes 29, and the ambient light passing through each semiconductor layer 49 can be made incident on the I-type region of each PIN diode 29. The reflectors 59 are formed in the same layer as the gate electrodes constituting the transistors in the pixel region, and can therefore be formed without increasing the number of processes. As described above, in this exemplary embodiment, it is possible to make a sufficient amount of ambient light incident on the light receiving diodes and to ensure a detection of the illuminance of the ambient light.

Second Exemplary Embodiment

Figure 6:
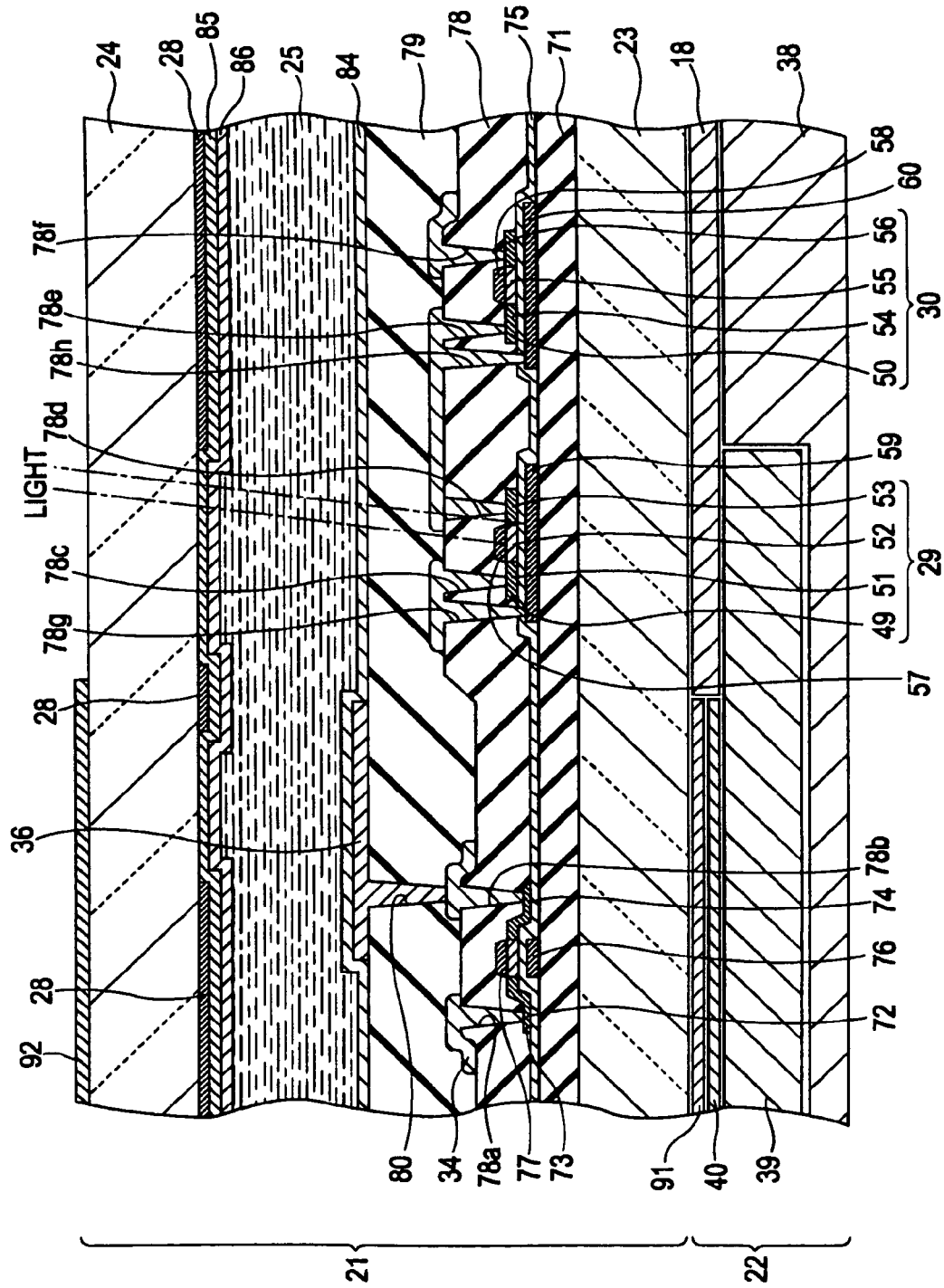
FIG. 6 is a perspective view schematically showing the electro-optical device according to a second exemplary embodiment of the invention.

FIG. 6 is a perspective view schematically showing the electro-optical device according to a second exemplary embodiment of the invention. In FIG. 6, the same reference numerals will be used to designate the same components as those in FIG. 1, so that the description will be omitted.

The reflectors 59 in the first exemplary embodiment are formed of metal and are in a floating status. Therefore, an unforeseen parasitic capacity is generated between the cathode (N-type region 51) of each PIN diode 29 and the corresponding reflector 59 and between the anode (P-type region 53) of each PIN diode 29 and the corresponding reflector 59. In addition, the reflectors 59 can be charged with static electricity. In this case, the electrical impact due to the reflectors 59 is brought on the anodes and cathodes of the PIN diodes 29. In this case, by extending each reflector 59 up to under the corresponding anode and up to under the corresponding cathode in the same manner, the electrical impact of each reflector 59 on the corresponding anode can be made substantially the same as the electrical impact of each reflector 59 on the corresponding cathode. That is to say, the characteristics of each PIN diode 29 can be prevented from changing due to the static electricity charged in the corresponding reflector 59.

However, in the first exemplary embodiment, while each PIN diode 29 is provided with the reflector 59, each PIN diode 30 is provided with no reflector. Therefore, the PIN diodes 29 and 30 will have different characteristics. To solve this problem, in this exemplary embodiment, a reflector 60 is provided under each PIN diode 30.

In FIG. 6, as with the reflector 59 provided under each PIN diode 29, the reflector 60 is formed under each PIN diode 30 and in the same layer as the gate electrodes 76 of the pixel region. Each reflector 60 is formed opposite the corresponding semiconductor layer 50 with the oxide film 75 therebetween.

In addition, in this exemplary embodiment, in the interlayer insulating film 78 are formed contact holes 78*g* and 78*h* leading to the reflectors 59 and 60. In each PIN diode 29, the N-type region 51 constituting the cathode is connected to the corresponding reflector 59 via the corresponding contact holes 78*c* and 78*g*. In each PIN diode 30, the N-type region 54 constituting the cathode is connected to the corresponding reflector 60 via the corresponding contact holes 78*e* and 78*h*.

That is to say, each reflector 59 and each reflector 60 are connected to the N-type regions 51 and 54, respectively, of the corresponding PIN diodes 29 and 30, respectively, and are out of the floating status. Therefore, the characteristics of the PIN diodes 29 and 30 can be further stabilized.

As described above, in this exemplary embodiment, the reflector 60 is provided under every one of the PIN diodes 30, for example, for detecting the dark current and disposed near the PIN diodes 29 for detecting the ambient light, and therefore each pair of PIN diodes 29 and 30 can have substantially the same characteristic. In addition, the reflectors 59 and 60 are connected to the corresponding cathodes and are thereby out of the floating status. Therefore, the characteristics of each pair of PIN diodes 59 and 60 can be further stabilized.

Although the reflectors 59 and 60 are connected to the cathodes of the corresponding PIN diodes 29 and 30 and are thereby out of the floating status in this exemplary embodiment, all that is required is that each reflector 59 or 60 is connected to a predetermined fixed potential point. For example, the reflectors 59 and 60 may be connected to the anodes of the corresponding PIN diodes or the reference potential point.

Figure 7:
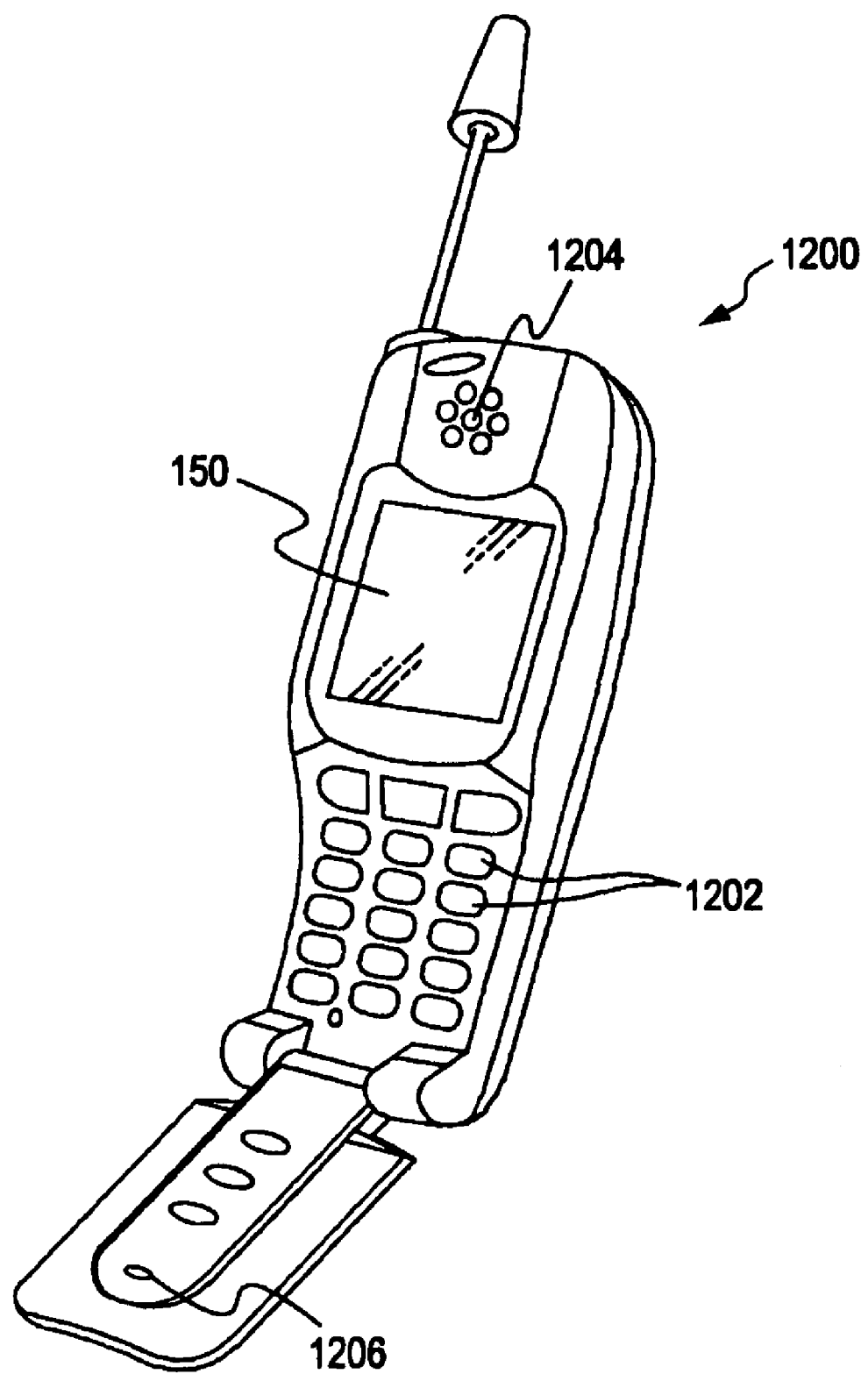
FIG. 7 is a perspective view showing an example of an electronic apparatus.

An electronic apparatus employing any one of the above-described electro-optical devices is also included in the invention. FIG. 7 is a perspective view showing the configuration of a cell phone 1200 employing any one of the electro-optical devices of the above-described exemplary embodiments.

As shown in FIG. 7, the cell phone 1200 includes a plurality of operation buttons 1202, an ear piece 1204, a mouthpiece 1206, and the above-described liquid crystal panel 150. All components of the electro-optical device except for the liquid crystal panel 150 are built into the cell phone and are not exposed.

The electro-optical devices according to the invention can also be employed in a projection display apparatus including a light source, a light valve modulating light emitted from the light source, and an optical system for projecting the light modulated by the light valve. In addition, the electro-optical devices according to the invention can also be employed in televisions, camcorders (viewfinders or screens), car navigation systems, pagers, electronic notebooks, calculators, word processors, workstations, video-phones, POS terminals, digital still cameras, apparatuses having a touch panel, and the like.

The electro-optical devices of the invention can be applied not only to TFT (thin film transistor) liquid crystal panels but also to liquid crystal display panels including TFDs (thin film diodes) as switching elements. The invention can be applied not only to liquid crystal display panels but also to various electro-optical devices, for example, electroluminescence devices, organic electroluminescence devices, plasma display devices, electrophoretic display devices, devices using electron emission (field emission displays, and surface-conduction electron-emitter displays), DLP (Digital Light Processing) (also known as DMD: Digital Micromirror Device).

The entire disclosure of Japanese Patent Application No. 2006-54425, filed Mar. 1, 2006 is expressly incorporated by reference herein.

What is claimed is:

1. An electro-optical device comprising:
    a display panel that includes an element substrate on which a switching element connected to a pixel electrode is provided;
    a first light receiving element formed on the element substrate and detect a luminance of an ambient light;
    a second light receiving element connected to the first light receiving element and being shielded from an ambient light;
    a reflector provided downside of the first light receiving element such that the reflector reflects the ambient light toward the first light receiving element.

2. The electro optical device according to claim 1, the reflector being provided between the element substrate and the first light receiving element.

3. The electro optical device according to claim 2, the switching element including a thin film transistor, and the reflector being formed as the same layer with a gate electrode with the thin film transistor.

4. The electro optical device according to claim 1, the switching element, the first light receiving element and second light receiving element having a semiconductor layer formed as the same layer.

5. The electro optical device according to claim 1, the display panel having an opposite substrate opposites to the element substrate, the electro optical device further comprising:
a light shielding film provided on the opposite substrate and defining an effective display region of the display panel,
the light shielding film blocking the ambient lights from entering the second light receiving element.

6. The electro optical device according to claim 5, the light shielding film having an opening, and the ambient lights incidents on the first light receiving element via the opening.

7. The electro optical device according to claim 1, the display panel having an opposite substrate opposites to the element substrate,
the electro optical device further comprising:
an illuminating unit that emits lights onto the display panel from the element substrate side,
the reflector blocking the lights of the illuminating unit from entering the first light receiving element.

8. The electro optical device according to claim 7, further comprising a second reflector provided downside of the second light receiving element such that the second reflector detects the lights of illuminating unit.

9. The electro optical device according to claim 7, further comprising a second reflector provided downside of the second light receiving element such that the second reflector blocks the lights of the illuminating unit from entering the second light receiving element.

10. The electro optical device according to claim 9, the reflector and the second reflector being formed as the same layer.

11. An electronic apparatus comprising the electro-optical device according to claim 1.

* * * * *